United States Patent
Hongo

(10) Patent No.: US 10,028,009 B2
(45) Date of Patent: Jul. 17, 2018

(54) CAMERA-CONNECTION-TYPE SOUND RECORDING APPARATUS

(71) Applicant: TEAC CORPORATION, Tokyo (JP)

(72) Inventor: Ryotaro Hongo, Saitama-ken (JP)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 15/221,457

(22) Filed: Jul. 27, 2016

(65) Prior Publication Data

US 2017/0034575 A1 Feb. 2, 2017

(30) Foreign Application Priority Data

Jul. 31, 2015 (JP) .................................. 2015-151856

(51) Int. Cl.
*H04N 21/4363* (2011.01)
*H04N 5/765* (2006.01)
(Continued)

(52) U.S. Cl.
CPC ....... *H04N 21/43635* (2013.01); *G09G 5/006* (2013.01); *H04N 5/765* (2013.01);
(Continued)

(58) Field of Classification Search
CPC ............. H04N 21/43635; H04N 5/765; H04N 21/42203; H04N 21/4223; H04N 21/439; H04N 5/77
See application file for complete search history.

(56) References Cited

U.S. PATENT DOCUMENTS 9,369,615 B1 * 6/2016 Rice ...................... H04N 5/2252
9,462,340 B1 * 10/2016 Mathurin ....... H04N 21/234336
(Continued)

FOREIGN PATENT DOCUMENTS

| CN | 202261607 U | 5/2012 |
|---|---|---|
| JP | 2003-078863 A | 3/2003 |
| JP | 2003-199045 A | 7/2003 |
| JP | 2009-260458 A | 11/2009 |
| WO | 2013108405 A1 | 7/2013 |

OTHER PUBLICATIONS

Cypeurope: "AU-11CA-4k Embed Audio onto HDMI (4K Resolution support) Operation Manual", Jun. 11, 2013, XCP055318026, Retrieved from the Internet: URL: Http://www.hypex.co.uk/files/pdf/18059/AU-11CA-4K_manual.pclf (retrieved Nov. 9, 2016).
Extended European Search Report, dated Nov. 17, 2016, for corresponding EP Application No. 16181492.6-1902, 10 pages.

*Primary Examiner* — Mishawn Hunter
(74) *Attorney, Agent, or Firm* — Seed Intellectual Property Law Group LLP

(57) ABSTRACT

A sound recording apparatus is provided which is HDMI-connected to a camera and another device, which outputs a video image signal from the camera to the other device without processing, and which outputs to the other device, without degradation, an audio signal recorded separately from the camera. A sound recording apparatus is HDMI-connected to a camera and a backup image recording apparatus. The sound recording apparatus includes an HDMI receiver that receives an HDMI signal transmitted from the HDMI-connected camera, a controller that embeds an audio signal which is input from a microphone which is connected to the apparatus in an audio channel portion of the HDMI single, and an HDMI transmitter that outputs to the backup image recording apparatus the video image signal included in the HDMI signal and the audio signal embedded by the controller.

9 Claims, 3 Drawing Sheets

(51) Int. Cl.
  *H04N 21/422*   (2011.01)
  *H04N 21/4223*  (2011.01)
  *H04N 21/439*   (2011.01)
  *G09G 5/00*     (2006.01)
  *H04N 5/77*     (2006.01)

(52) U.S. Cl.
  CPC ... *H04N 21/4223* (2013.01); *H04N 21/42203* (2013.01); *H04N 21/439* (2013.01); *G09G 2370/12* (2013.01); *H04N 5/77* (2013.01)

(56)           References Cited

U.S. PATENT DOCUMENTS

| | | | |
|---|---|---|---|
| 9,659,504  | B2 * | 5/2017  | Jackson ............ G09B 5/06 |
| 2003/0118059 | A1 | 6/2003  | Sugahara |
| 2007/0044137 | A1 | 2/2007  | Bennett |
| 2007/0133622 | A1 | 6/2007  | Sugahara |
| 2007/0133623 | A1 | 6/2007  | Sugahara |
| 2007/0133624 | A1 | 6/2007  | Sugahara |
| 2007/0160090 | A1 | 7/2007  | Sugahara |
| 2009/0207909 | A1 | 8/2009  | Sugahara |
| 2009/0214181 | A1 | 8/2009  | Sugahara |
| 2009/0214182 | A1 | 8/2009  | Sugahara |
| 2009/0214183 | A1 | 8/2009  | Sugahara |
| 2009/0214184 | A1 | 8/2009  | Sugahara |
| 2009/0214185 | A1 | 8/2009  | Sugahara |
| 2009/0214186 | A1 | 8/2009  | Sugahara |
| 2009/0214188 | A1 | 8/2009  | Sugahara |
| 2009/0214189 | A1 | 8/2009  | Sugahara |
| 2009/0214190 | A1 | 8/2009  | Sugahara |
| 2009/0214287 | A1 | 8/2009  | Usui et al. |
| 2009/0245348 | A1 | 10/2009 | Sugahara |
| 2012/0120270 | A1 * | 5/2012 | Li ............ H04N 5/60 |
| | | | 348/222.1 |
| 2013/0050582 | A1 | 2/2013  | Tran et al. |
| 2013/0188082 | A1 | 7/2013  | Hashiguchi |
| 2014/0259050 | A1 * | 9/2014 | Goldberg ....... H04N 21/2368 |
| | | | 725/32 |
| 2015/0070340 | A1 * | 3/2015 | Trachtenberg ..... H04N 21/4122 |
| | | | 345/211 |
| 2016/0073158 | A1 | 3/2016  | Trieber |

* cited by examiner

CAMERA-CONNECTION-TYPE SOUND RECORDING APPARATUS

CROSS REFERENCE TO RELATED APPLICATION

The entire disclosure of Japanese Patent Application No. 2015-151856 filed on Jul. 31, 2015 including specification, claims, drawings and abstract is incorporated herein by reference in its entirety.

TECHNICAL FIELD

The present disclosure relates to a camera-connection-type sound recording device, and in particular to control of an audio signal.

BACKGROUND

It has become common that a digital single-lens reflex camera or a mirror-less single-lens reflex camera can record not only a still image, but also a video image. However, with regard to the sound recording quality for the sound during recording of the video image, the level of quality is yet not sufficient.

In consideration of this, some users of the digital single-lens reflex camera or the mirror-less single-lens reflex camera record the video images with the camera, and at the same time, with regard to the sound, record the sound using a dedicated sound-recording apparatus. These users later mix video image data and sound data using a personal computer or the like, and produce a video image having high image quality and high sound quality.

JP 2003-078863 A discloses a portable communication apparatus in which a video image file and a sound file are separately recorded in a memory, and, after processing such as a checking operation and a post-recording operation is executed, the video image file and the sound file are multiplexed and recorded during a storage operation.

JP 2003-199045 A discloses that, in an AV multiplexed file in which a video image signal and a first audio signal are multiplexed, the first audio signal is replaced with a second audio signal based on synchronization information.

WO 2013/108405 discloses that an embedded audio signal included in a video camera video signal is separated, and the separated digital signal is converted into an analog signal and is output.

A scheme may be considered in which a video image is captured with a camera, sound is recorded with a sound recording apparatus, the camera and a backup image recording apparatus are connected to supply the video image signal to the backup image recording apparatus, and the sound recording apparatus and the backup image recording apparatus are connected to supply the audio signal to the backup image recording apparatus. However, many of the backup image recording apparatuses, while having an HDMI (registered trademark; High-Definition Multimedia Interface) input terminal, have only an analog sound input terminal as a sound input terminal. In this case, the connection between the sound recording apparatus and the backup image recording apparatus is achieved as an analog connection, and thus, degradation of the audio signal may be caused.

SUMMARY

One advantage of the present disclosure lies in the provision of a camera-connection-type sound recording apparatus which is HDMI-connected to a camera and another device, which outputs a video image signal from the camera to the other device without processing, and which can output to the other device, without any degradation, an audio signal which is recorded separately from the camera.

According to one aspect of the present disclosure, there is provided a camera-connection-type sound recording apparatus, comprising: an HDMI receiver that receives an HDMI signal transmitted from a camera which is HDMI-connected to the sound recording apparatus; a controller configured to embed, in an audio channel portion of the HDMI signal, an audio signal which is input from a microphone which is connected to the sound recording apparatus; and an HDMI transmitter that outputs, to an external device, a video image signal included in the HDMI signal and the audio signal embedded by the controller.

According to another aspect of the present disclosure, the controller is configured to embed, when an audio signal already exists in any of channels of the audio channel portion of the HDMI signal, the audio signal which is input from the microphone in a channel different from that channel.

According to another aspect of the present disclosure, the controller is configured to embed, when an audio signal already exists in any of channels of the audio channel portion of the HDMI signal, the audio signal which is input from the microphone in that channel.

According to another aspect of the present disclosure, the controller is configured to embed, when no audio signal exists in any of channels of the audio channel portion of the HDMI signal, the audio signal which is input from the microphone in a predetermined channel, and to embed, when an audio signal already exists in any of the channels of the audio channel portion of the HDMI signal, the audio signal which is input from the microphone in a channel different from that channel.

According to various aspects of the present disclosure, an apparatus is HDMI-connected to a camera and an external device, a video image signal from the camera can be output to the external device without processing, and an audio signal which is recorded separately from the camera can be output to the external device without degradation.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described with reference to the drawings. The following embodiment, however, is merely exemplary, and the present disclosure is not limited to the following embodiment.

Figure 1:
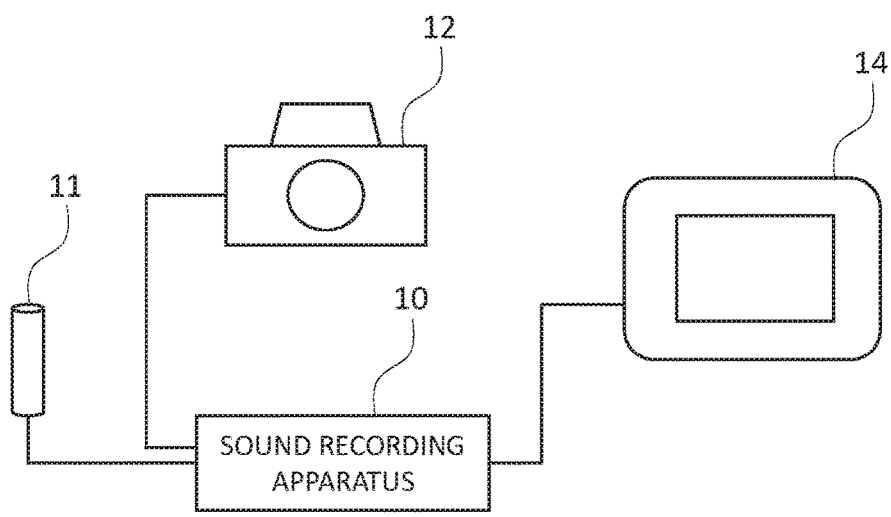
FIG. 1 is a system structural diagram of an embodiment of the present disclosure.

FIG. 1 is a system structural diagram of a state in which a sound recording apparatus 10 according to an embodiment of the present disclosure is connected to a camera 12 and a backup image recording apparatus 14. The camera 12 is a digital single-lens reflex camera, a mirror-less single-lens reflex camera, or the like, and is connected to the sound recording apparatus 10 through a wired HDMI or a wireless HDMI. The backup image recording apparatus 14 includes an input/output interface, a recoding medium such as a semiconductor memory, a hard disk drive, or the like, and a video image/sound output apparatus, and is connected to the sound recording apparatus 10 through a wired HDMI or a wireless HDMI.

In the present embodiment, an example configuration is described in which the sound recording apparatus 10 and the camera 12 are connected to each other by an HDMI cable, and the sound recording apparatus 10 and the backup image recording apparatus 14 are connected to each other by an HDMI cable.

The sound recording apparatus 10 is a PDM recorder, and records a sound signal in a linear PCM:WAV format which does not apply compression nonreversibly. Alternatively, a nonreversible compression scheme such as MP3 or the like may be employed.

The sound recording apparatus 10 receives a video image signal included in an HDMI signal from the HDMI-connected camera 12, and outputs the video image signal to the HDMI-connected backup recording apparatus 14 without any processing and as an HDMI repeater device. Meanwhile, the sound recording apparatus 10 converts an analog audio signal which is input from a microphone 11 which is connected to the apparatus into a digital signal, embeds the digital signal in an audio CH of the HDMI signal from the camera, and outputs to the HDMI-connected backup image recording apparatus 14. Specifically, in the HDMI, 8 CHs are allocated as audio channels (CHs), and the digital audio signal is embedded in some CHs of the 8 CHs; for example, when the digital audio signal corresponds to 2 CHs, predetermined 2 CHs of the 8 CHs (for example, when the 8 CHs are first-eighth CHs, the first CH and the second CH).

Therefore, the backup image recording apparatus 14 receives, from the HDMI-connected sound recording apparatus 10 and through HDMI, both the video image signal captured by the camera 12 and the audio signal recorded by the sound recording apparatus 10. Even when the backup image recording apparatus 14 has only the analog sound input terminal as the sound input terminal, a high-quality audio signal can be input from the HDMI input terminal.

Here, many of the cameras 12 do not output sound even though the camera 12 has an HDMI output terminal. However, in some cases, the camera 12 has a sound output function. In this case, the HDMI signal which is input to the sound recording apparatus 10 includes not only the video image signal, but also the audio signal recorded by the camera 12. In this case, the sound recording apparatus 10 detects whether or not there exists an audio signal in the audio CH of the HDMI signal from the camera 12, embeds, when there is no audio signal, the audio signal in the predetermined CHs of the 8 CHs of audio as described above, and embeds, when there exists an audio signal, the audio signal in CHs other than the CHs in which that audio signal exists.

Figure 2:
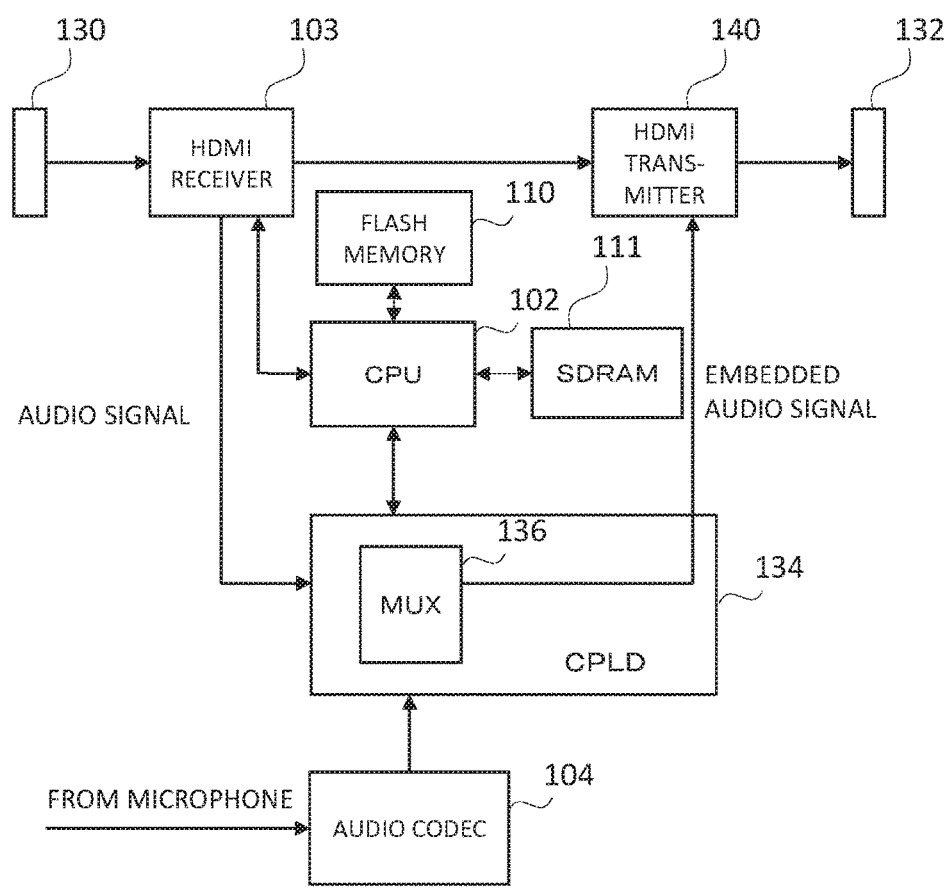
FIG. 2 is a structural block diagram of a camera-connection-type sound recording apparatus according to an embodiment of the present disclosure.

FIG. 2 is a structural block diagram of the sound recording apparatus 10 according to the present embodiment. The sound recording apparatus 10 includes an HDMI input terminal (HDMI IN) 130, an HDMI output terminal (HDMI OUT) 132, an HDMI receiver 103, an HDMI transmitter 140, a CPU 102, a CPLD (Complex Programmable Logic Device) 134, an audio CODEC 104, and a multiplexer (MUX) 136. In the present embodiment, the CPU 102 and the CPLD 134 function as a controller.

The HDMI input terminal 130 is connected to the camera 12 through an HDMI cable.

The HDMI receiver 103 outputs, from a TMDS signal and a TMDS clock signal transmitted from the camera 12 through the HDMI cable, an LRCK signal, a BCLK (or SCLK) signal, a data signal, and an MCLK signal. The CPU 102 is connected to the HDMI receiver 103 through an I2C bus, and controls the operation of the HDMI receiver 103. The HDMI receiver 103 outputs the video image signal included in the data signal to the HDMI transmitter 140 without processing and as an HDMI repeater device. Meanwhile, the HDMI receiver 103 supplies the audio signal included in the data signal to the CPLD 134.

The CPLD 134 receives the audio signal which is output from the HDMI receiver 103, and inputs the audio signal to the multiplexer (MUX) 136 and outputs the audio signal to the CPU 102. The CPLD is one type of a programmable logic device, and is configured by a non-volatile memory on a chip. The analog audio signal which is input from the microphone 11 is converted into a digital signal by the audio CODEC 104 and is supplied to the CPLD 134. In the following, for the convenience of the description, the audio signal included in the HDMI signal from the camera 12 will be referred to as a camera audio signal, and the audio signal from the microphone 11 will be referred to as a microphone audio signal, in order to distinguish the audio signals.

The CPU 102 reads a processing program and executes a predetermined process using a flash memory 110 and an SDRAM 111 as a program memory and a working memory, respectively. For example, CPU 102 records the sound by recording audio data in an SD card memory equipped in an SD card connector (not shown). In addition, the CPU 102 detects whether or not there is an audio signal in each CH of the camera audio signal of 8 CHs supplied from the CPLD 134. When the CPU 102 detects that there is no camera audio signal, the CPU 102 outputs a control signal to the multiplexer (MUX) 136 of the CPLD 134, for embedding the microphone audio signal in the predetermined CHs; for example, the first CH and the second CH, of the 8 CHs. In response to the instruction from the CPU 102, the multiplexer (MUX) 136 embeds (multiplexes) the microphone audio signal in the predetermined CHs, and outputs the resulting signal to the HDMI transmitter 140. On the other hand, when the CPU 102 detects that a camera audio signal exists, the CPU 102 outputs a control signal to the multiplexer (MUX) 136 of the CPLD 134, to embed the signal in CHs, of the 8 CHs, different from the CHs in which the camera audio signal exists; for example, when the camera audio signal exists in the first CH and the second CH, the seventh CH and the eighth CH. In response to the instruction from the CPU 102, the multiplexer (MUX) 136 embeds (multiplexes) the microphone audio signal in CHs different from the CHs of the camera audio signal, and outputs the resulting signal to the HDMI transmitter 140.

The HDMI transmitter 140 supplies to the HDMI output terminal 132 the video image signal from the HDMI receiver 103 and the audio signal in which the microphone audio signal is embedded by the CPLD 134.

Figure 3:
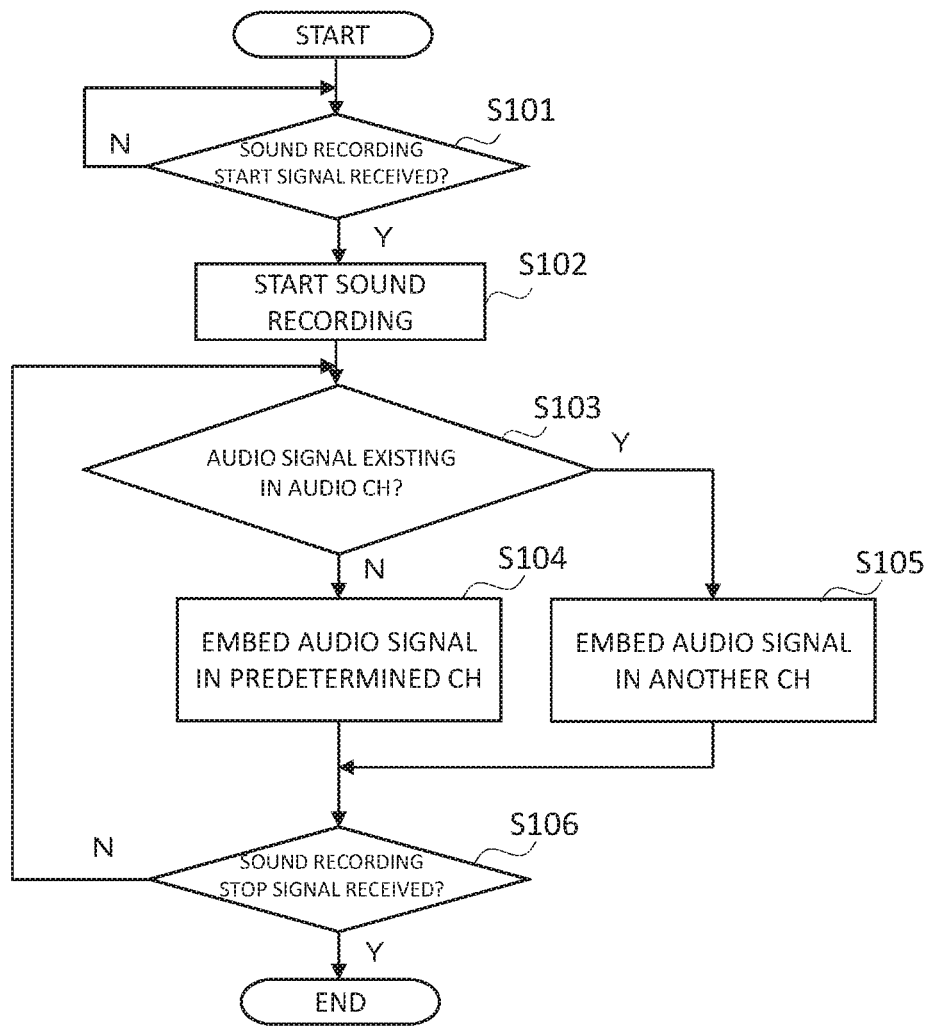
FIG. 3 is a process flowchart of an embodiment of the present disclosure.

FIG. 3 is a process flowchart of the present embodiment, and shows the process by the CPU 102.

First, the CPU 102 determines whether or not a sound recording start signal is received, based on a control signal included in the HDMI signal from the camera 12 (S101).

When the sound recording start signal is received, the CPU 102 starts sound recording (S102). Specifically, an analog audio signal (microphone audio signal) is input from the connected microphone 11, is converted into a digital signal by the audio CODEC 104, is input through the CPLD 134, and is stored in the SDRAM 111.

Next, the CPU 102 determines whether or not there exists a camera audio signal in the audio CHs of the HDMI signal from the camera 12 (S103). Methods for detecting existence/absence of the digital audio signal are known, and an arbitrary detection method may be used in the present embodiment. When it is determined as a result of the determination that there is no camera audio signal, the CPU 102 embeds the microphone audio signal supplied from the audio CODEC 104 in predetermined CHs of the audio CHs (S104). On the other hand, when a camera audio signal exists, the CPU 102 embeds the microphone audio signal supplied from the audio CODEC 104 in the CHs, of the audio CHs, where there is no camera audio signal (S105).

Specifically, when the audio CH of the HDMI signal from the camera 12 has a configuration:

First CH: None,
Second CH: None,
Third CH: None,
Fourth CH: None,
Fifth CH: None,
Sixth CH: None,
Seventh CH: None, and
Eighth CH: None, the CPU 102 and the multiplexer (MUX) 136 produce an embedded audio signal having a configuration:

First CH: Microphone audio signal (L),
Second CH: Microphone audio signal (R),
Third CH: None,
Fourth CH: None,
Fifth CH: None,
Sixth CH: None,
Seventh CH: None, and
Eighth CH: None, and output the embedded audio signal to the HDMI transmitter 140.

When the audio CH of the HDMI signal from the camera 12 has a configuration:

First CH: Camera audio signal (L),
Second CH: Camera audio signal (R),
Third CH: None,
Fourth CH: None,
Fifth CH: None,
Sixth CH: None,
Seventh CH: None, and
Eighth CH: None, the CPU 102 and the multiplexer (MUX) 136 produce an embedded audio signal having a configuration:

First CH: Camera audio signal (L),
Second CH: Camera audio signal (R),
Third CH: None,
Fourth CH: None,
Fifth CH: None,
Sixth CH: None,
Seventh CH: Microphone audio signal (L), and
Eighth CH: Microphone audio signal (R), and output the embedded audio signal to the HDMI transmitter 140.

By embedding the microphone audio signal in CHs different from those of the camera audio signal, it becomes possible to supply to the backup image recording apparatus 14 the microphone audio signal in addition to the camera audio signal, and to allow the user to listen to both audio signals. In some cases, the user may wish to record a particular sound with the camera 12 and to record different sounds with the microphone 11, and the above-described configuration is useful in such cases.

In the above-described case, by setting the predetermined CHs as the seventh CH and the eighth CH from the beginning, it is possible to embed the microphone audio signal in CHs other than the CHs of the camera audio signal regardless of the existence or absence of the camera audio signal. However, in this case also, although the CHs are predetermined CHs, the configuration is not different from the above-described configuration, in that the microphone audio signal is embedded in CHs different from the CHs in which the camera audio signal exists.

The above-described processes are repeated until a sound recording stop signal is received, and, when the sound recording stop signal is received, the process is completed (S106). Although not shown in the figures, the process is also completed when the HDMI signal cannot be received.

As described, in the present embodiment, the audio signal which is input from the microphone 11 is embedded in the HDMI signal from the camera 12 and supplied to the backup image recording apparatus 14, and thus, it is possible to supply a high-quality audio signal along with the video image signal without causing degradation of the audio signal.

In addition, the sound recording apparatus 10 of the present embodiment operates in synchronization with recording start/stop included in the HDMI signal from the HDMI-connected camera 12, and thus, it is possible to record the microphone audio signal in synchronization with the video image captured by the camera 12, and to embed the microphone audio signal in the HDMI signal. In other words, in the present embodiment, the audio signal which is input from the microphone 11 is recorded at the same time as the capturing of the video image with the camera 12, and the microphone audio signal can be embedded in the audio CH of the HDMI signal and can be output. It should be noted that the process of the present embodiment differs from the so-called "post-recording" process where the audio signal is recorded afterwards while checking the video image signal.

In the present embodiment, the microphone audio signal is embedded in CHs different from those of the camera audio signal. Alternatively, the microphone audio signal may be embedded in the same CHs as the camera audio signal and the camera audio signal may be overwritten by the microphone audio signal as necessary or according to an operation from a user. With such a configuration, when the same sound is recorded by both the camera 12 and the microphone 11, only the high-quality audio signal recorded by the microphone 11 may be output to the backup image recording apparatus 14.

Alternatively, in the present embodiment, a plurality of sound recording apparatuses 10 may be cascade-connected to form a sound recording system. In this case, a microphone audio signal which is input from a microphone 11 connected to each sound recording apparatus 10 forming the sound recording system may be embedded in respective different audio CHs.

For example, when the plurality of sound recording apparatuses 10 are sound recording apparatuses 10*a*, 10*b*, and 10*c*, and the microphone audio signals from the microphones 11 respectively connected to the sound recording apparatuses 10*a*, 10*b*, and 10*c* are microphone audio signals a, b, and c, the following configuration may be obtained:

First CH: Camera audio signal (L),
Second CH: Camera audio signal (R),
Third CH: Microphone audio signal a (L),
Fourth CH: Microphone audio signal a (R),
Fifth CH: Microphone audio signal b (L),
Sixth CH: Microphone audio signal b (R), Seventh CH: Microphone audio signal c (L), and
Eighth CH: Microphone audio signal c (R).

The CPUs 102 of the sound recording apparatuses 10a, 10b, and 10c may be configured to set in advance (so that the CHs do not overlap) the audio CHs into which the microphone audio signals are to be embedded.

In addition, in the present embodiment, the CPU 102 determines the CH in which the camera audio signal or the microphone audio signal does not exist, based on the sound signal. Alternatively, it is also possible to extract information defining the audio CH number included in the HDMI signal, and to determine the CH in which the audio signals do not exist based on this information. However, when the audio signal is embedded, it is necessary to update and output the information defining the audio CH number which is output from the HDMI transmitter 140 (that is, add the information corresponding to the embedded audio CH number).

Alternatively, VSIF (Vender Specific Information) information (additional information related to the video image signal) included in the packet signal of the HDMI signal may be used to add, to the downstream information, the CH designation for embedding.

The invention claimed is:

1. A camera-connection-type sound recording apparatus, comprising:
   an HDMI receiver that receives an HDMI signal transmitted from a camera which is HDMI-connected to the sound recording apparatus;
   a controller configured to embed, in an audio channel portion of the HDMI signal, an audio signal which is input from a microphone which is connected to the sound recording apparatus, the controller being configured to enable a user to set an audio channel of the audio channel portion into which the audio signal is to be embedded; and
   an HDMI transmitter that outputs, to an external device, a video image signal included in the HDMI signal and the audio signal embedded by the controller.

2. The camera-connection-type sound recording apparatus according to claim 1, wherein
   the controller is configured to embed, when an audio signal already exists in one or more channels of a plurality of channels of the audio channel portion of the HDMI signal, the audio signal which is input from the microphone in at least one channel of the plurality of channels different from the one or more channels of the plurality of channels.

3. The camera-connection-type sound recording apparatus according to claim 1, wherein
   the controller is configured to embed, when an audio signal already exists in one or more channels of a plurality of channels of the audio channel portion of the HDMI signal, the audio signal which is input from the microphone in at least one channel of the one or more channels of the plurality of channels.

4. The camera-connection-type sound recording apparatus according to claim 1, wherein
   the controller is configured to embed, when no audio signal exists in any of a plurality of channels of the audio channel portion of the HDMI signal, the audio signal which is input from the microphone in at least one predetermined channel of the plurality of channels, and to embed, when an audio signal already exists in one or more channels of the plurality of channels of the audio channel portion of the HDMI signal, the audio signal which is input from the microphone in at least one channel of the plurality of channels different from the one or more channels of the plurality of channels.

5. The camera-connection-type sound recording apparatus according to claim 1, wherein
   the controller includes a programmable logic device,
   the programmable logic device includes a multiplexer, and
   the multiplexer embeds the audio signal which is input from the connected microphone in the audio channel portion of the HDMI signal.

6. The camera-connection-type sound recording apparatus according to claim 1, wherein
   the controller includes a processor and a programmable logic device, and
   the programmable logic device embeds the audio signal which is input from the connected microphone in the audio channel portion of the HDMI signal in response to a control signal from the processor.

7. The camera-connection-type sound recording apparatus according to claim 1, wherein
   the external device is a backup image recording apparatus.

8. The camera-connection-type sound recording apparatus according to claim 1, wherein
   the controller operates in synchronization with a sound recording start signal or a sound recording stop signal included in the HDMI signal.

9. A camera-connection-type sound recording system, comprising:
   a plurality of camera-connection-type sound recording apparatuses according to claim 1, connected in a cascaded manner, wherein
   each of the plurality of camera-connection-type sound recording apparatuses embeds the audio signal which is input from the connected microphone in the audio channel portion of the HDMI signal transmitted from the camera.

* * * * *